United States Patent
Oldham (10) Patent No.: US 8,150,979 B1
(45) Date of Patent: Apr. 3, 2012

(54) SUPPORTING MULTIPLE LANDING PAGES

(75) Inventor: Jeffrey D. Oldham, San Jose, CA (US)

(73) Assignee: Google Inc., Mountain View, CA (US)

( * ) Notice: Subject to any disclaimer, the term of this patent is extended or adjusted under 35 U.S.C. 154(b) by 787 days.

(21) Appl. No.: 11/757,919

(22) Filed: Jun. 4, 2007

(51) Int. Cl.
*G06F 15/16* (2006.01)

(52) U.S. Cl. ........................................ 709/228; 709/227

(58) Field of Classification Search .................. 709/246, 709/245
See application file for complete search history.

(56) References Cited

U.S. PATENT DOCUMENTS

| | | | | |
|---|---|---|---|---|
| 5,960,409 | A * | 9/1999 | Wexler | 705/14.41 |
| 6,609,005 | B1 * | 8/2003 | Chern | 455/457 |
| 6,802,068 | B1 * | 10/2004 | Guruprasad | 719/319 |
| 6,876,644 | B1 * | 4/2005 | Hsu et al. | 370/338 |
| 7,072,888 | B1 * | 7/2006 | Perkins | 707/733 |
| 7,136,932 | B1 * | 11/2006 | Schneider | 709/245 |
| 7,330,883 | B1 * | 2/2008 | Jessup et al. | 709/224 |
| 7,451,130 | B2 * | 11/2008 | Gupta et al. | 1/1 |
| 7,457,823 | B2 * | 11/2008 | Shraim et al. | 1/1 |
| 7,533,144 | B2 * | 5/2009 | Kassab | 709/203 |
| 7,801,945 | B1 * | 9/2010 | Geddes et al. | 709/203 |
| 2002/0049742 | A1 * | 4/2002 | Chan et al. | 707/1 |
| 2004/0031052 | A1 * | 2/2004 | Wannamaker et al. | 725/61 |
| 2004/0250680 | A1 * | 12/2004 | Wright | 96/108 |
| 2005/0021862 | A1 * | 1/2005 | Schroeder et al. | 709/246 |
| 2005/0027594 | A1 * | 2/2005 | Yasnovsky et al. | 705/14 |
| 2005/0105513 | A1 * | 5/2005 | Sullivan et al. | 370/352 |
| 2006/0036582 | A1 * | 2/2006 | Sondergaard et al. | 707/3 |
| 2006/0195468 | A1 * | 8/2006 | Yanagi et al. | 707/102 |
| 2006/0224752 | A1 * | 10/2006 | Parekh | 709/230 |
| 2006/0235886 | A1 * | 10/2006 | Norman | 707/104.1 |
| 2007/0083673 | A1 * | 4/2007 | Lara et al. | 709/246 |
| 2007/0099634 | A1 * | 5/2007 | Chari et al. | 455/456.3 |
| 2008/0126476 | A1 * | 5/2008 | Nicholas et al. | 709/203 |
| 2008/0140524 | A1 * | 6/2008 | Anand et al. | 705/14 |
| 2008/0195477 | A1 * | 8/2008 | Kennedy et al. | 705/14 |
| 2008/0201413 | A1 * | 8/2008 | Sullivan et al. | 709/203 |
| 2008/0263633 | A1 * | 10/2008 | Banga et al. | 726/3 |
| 2008/0288976 | A1 * | 11/2008 | Carson et al. | 725/34 |
| 2009/0249458 | A1 * | 10/2009 | Banga et al. | 726/7 |

* cited by examiner

*Primary Examiner* — Hieu Hoang

(74) *Attorney, Agent, or Firm* — Fish & Richardson P.C.

(57) ABSTRACT

A computer-implemented method is described including determining a value of an attribute related to a user of a first system connected to a network, generating a network location identifier based at least in par on the determined value, making the generated network location identifier available to the user, and upon detecting that the user has selected the generated network location identifier, providing the generated network location identifier to a second system on the network residing at a location corresponding, at least in part, to the generated network location identifier.

34 Claims, 4 Drawing Sheets

SUPPORTING MULTIPLE LANDING PAGES

TECHNICAL FIELD

The following description relates to systems and techniques for targeted advertising to users.

BACKGROUND

Internet advertising has gained significant popularity in recent years. Internet users frequently search the internet for products and services of interest. In turn, advertisers rely extensively on the internet to target audiences interested in the products and services that the advertisers offer. An example of internet advertising is the presentation of advertisements to users in response to users' searches for topics of interest using a website, e.g., www.google.com. In response to the user's query string containing one or more search keywords, the website can present results as well as advertisements pertaining to the query string. The advertisements can be received from advertisers. Another example of internet advertising is the presentation of advertisements on websites that users view. For example, an automobile manufacturer, e.g., Nissan, can display advertisements related to Nissan brand automobiles on websites such as www.cars.com. The publishers of the websites can obtain financial benefit for displaying the advertisers' products while the advertisers can target audiences that frequently view the contents of the website.

SUMMARY

In general, this document describes dynamically generating uniform resource locators (URLs) based on specific attributes of a user and providing the generated URLs to an advertiser. In one example, an advertiser can provide advertisements and associated keywords to a system. Each advertisement can have an associated landing page, i.e., a web page that a user is led to when a user clicks on a URL. The advertisements can be in the form of URLs such that each URL provided by the advertiser can point to an advertiser's landing page. The system can be configured to determine attributes of a user, e.g., a user's geographic location. In addition, the system can be configured to insert the user attributes into the URLs that point to the one or more landing pages provided by the advertiser. Subsequently, the system can detect the URLs that the user has selected and direct the user to one of the landing page URLs containing inserted user attributes. Advertisers can design landing pages based on the received user attributes received to better target content to visitors.

In one aspect, a computer implemented method is described. The method includes determining a value of an attribute related to a user of a first system connected to a network, generating a network location identifier based at least in part on the determined the value, making the generated network location identifier available to the user, and upon detecting that the user has selected the generated network location identifier, providing the generated network location identifier to a second system on the network residing at a location corresponding, at least in part, to the generated network location identifier.

This, and other aspects, can include one or more of the following features. The network can be the Internet. The attribute can be a network address of the first system. The attribute can be related to a geographical location of the user. The geographical location can include one or more of a city, a metro, state, a country, a postal code, a latitude, a longitude, and a telephone number. Generating the network location identifier can include building a uniform resource locator (URL) including inserting the determined value into a predetermined URL format. Inserting the determined value can include encoding the value into a syntax of the URL. The predetermined URL format can be specified by an entity associated with the second system of the network. Making the generated network location identifier available to the user can include presenting the user with a token representing the generated network location identifier. The token can include text, graphics, or a combination of both. The presented token can include a clickable link. Detecting that the user has selected the generated network location identifier can include detecting that the user has clicked on the clickable link. Providing the generated network location identifier to the second system can include transmitting the generated network location identifier from the first system to the second system. Generating the network location identifier can include organizing information including the determined value into a predetermined URL format such that the information can be extracted by the second system and used to present customized content to the user. The customized content can include a dynamically generated web page to be presented to the user. The generated network location identifier can correspond to a URL of a pre-existing web page.

In another aspect, a system is described. The system includes an external engine configured to determine the value of an attribute related to a user of the first system connected to a network, generate the network location identifier based at least in part on the determined value, make the generated network location identifier available to the user, and upon detecting that the user has selected the generated network location identifier, provide the generated network location identifier to a second system on the network residing at the location corresponding, at least in part, to the generated network location identifier.

This, and other aspects, can include one or more of the following features. The network can be the Internet. The attribute can be a network address of the first system. The attribute can be related to a geographical location of the user. The geographical location can include one or more of the city, a metro, a state, a country, a postal code, a latitude, longitude, and a telephone number. The external engine configured to generate the network location identifier can further be configured to build a uniform resource locator (URL) by inserting the determined value into a predetermined URL format. The external engine configured to insert the determined value into the predetermined URL format can further be configured to encode the value into a syntax of the URL. The predetermined URL format can be specified by an entity associated with the second system on the network. The external engine configured to make the generated network location identifier available to the user can further be configured to present the user with the token representing the generated network location identifier. The token can include text, graphics, or a combination of both. The presented token can include a clickable link. The external engine configured to detect that the user has selected the generated network location identifier can further be configured to detect that the user has clicked on the clickable link. The external engine configured to provide the generated network location identifier to this second system can further be configured to transmit the generated network location identifier from the first system to the second system. The external engine configured to generate the network location identifier can further be configured to organize information including the determined value into a predetermined URL format such that the information can be extracted by the second system and used to present customized content to the user. The customized content can be based on the user's location. The customized content can include a dynamically generated web page to be presented to the user. The generated network location identifier can correspond to a URL of a pre-existing web page.

In another aspect, a system includes means for determining a value of an attribute related to a user of the first system connected to a network, means for generating a network location identifier based at least in part on the determined value, means for making the generated network location identifier available to the user, and upon detecting that the user has selected the generated network location identifier, means for providing the generated network location identifier to a second system on the network residing at the location corresponding, at least in part, to the generated network location identifier.

This, and other aspects, can include one or more of the following features. The network can be the Internet. The attribute can be a network address of the first system. The attribute can be related to a geographical location of the user. The geographical location can include one or more of a city, a metro, a state, a country, a postal code, a latitude, longitude, and a telephone number. The means for generating the network location identifier can further include means for building a uniform resource locator (URL) by inserting the determined value into a predetermined URL format. The means for inserting the determined value into the predetermined URL format can further include means for encoding the value into a syntax of the URL. The predetermined URL format can be specified by an entity associated with the second system on the network. The means for making the generated network location identifier available to the user can further include means for presenting the user with a token representing the generated network location identifier. The token can include text, graphics, or combinations of both. The presented token can include a clickable link. The means for detecting that the user has selected the generated network location identifier can further include means for detecting that the user has clicked on the clickable link. The means for providing the generated network location identifier to the second system can further include means for transmitting the generated network location identifier from the first system to the second system. The means for generating the network location identifier can further include means for organizing information including the determined value into a predetermined URL format such that the information can be extracted by the second system and used to present customized content to the user. The customized content can be based on the user's location. The customized content can include a dynamically generated web page to be presented to the user. The generated network location identifier can correspond to a URL of a pre-existing web page.

In another aspect, a computer implemented method is described. The method includes determining the value of an attribute related to a user of the first system connected to a network, generating a network location identifier based at least in part on the determined value, making the generated network location identifier available to the user, and upon detecting that the user has selected the generated network location identifier, providing content corresponding, at least in part, to the determined value to the user.

In another aspect, a system is described. The system includes an external engine configured to determine a value of an attribute related to a user of the first system connected to a network, make the generated network location identifier available to the user, and upon detecting that the user has selected the generated network location identifier, provide content corresponding, at least in part, to the determined value to the user.

In another aspect, a system is described. The system includes means for determining a value of an attribute related to a user of the first system connected to a network, means for making the generated network location identifier available to the user, and means for providing content responding, at least in part, to the determined value to the user, upon detecting that the user has selected the generated network location identifier.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
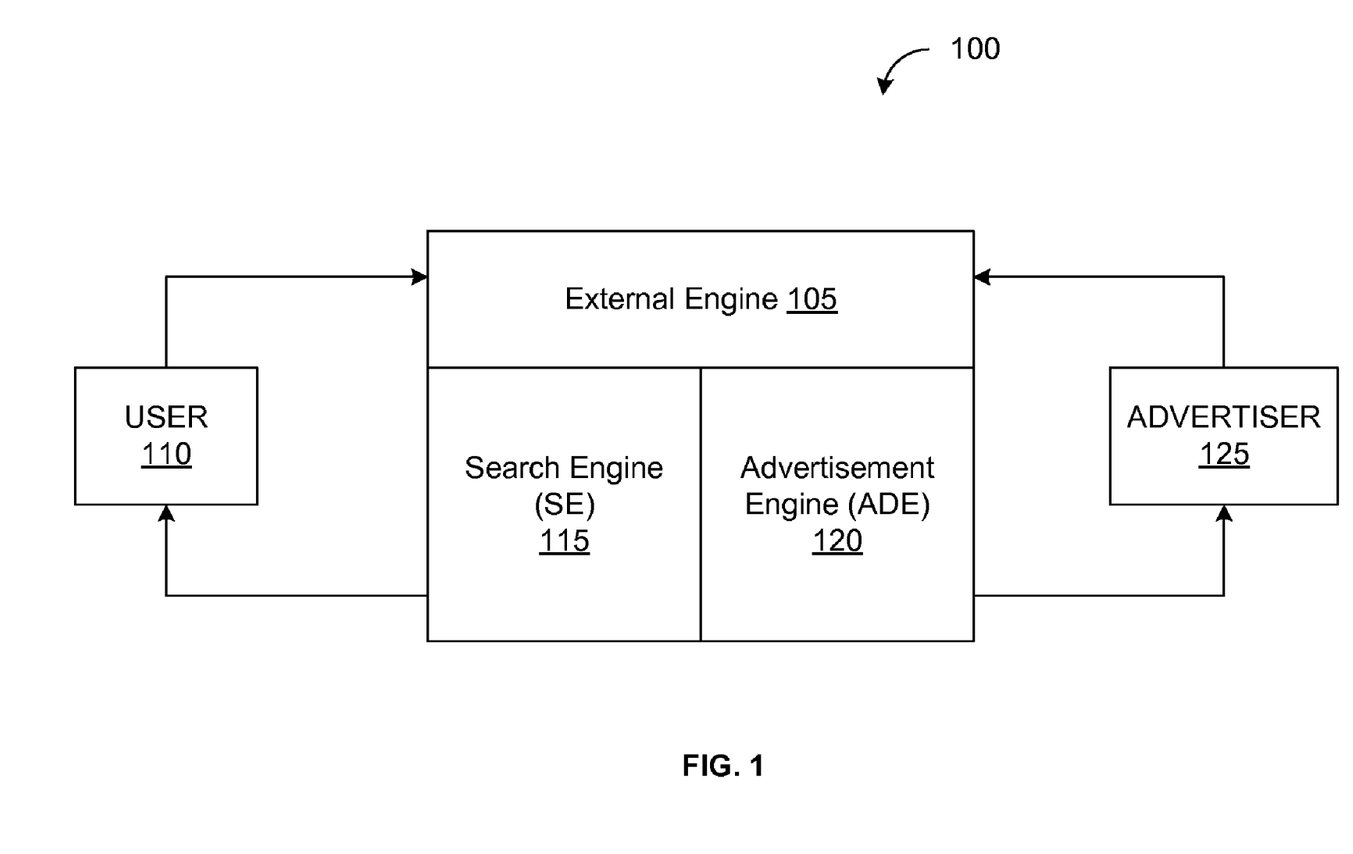
FIG. 1 is a block diagram of an example of a system for capturing user attributes to provide to an advertiser.

FIG. 1 depicts an example of a system 100 for capturing user attributes to provide to an advertiser. The system 100 can include an external engine 105 configured to receive input from a user 110 of a first system. In some implementations, the first system can be a desktop computer. The first system and the external engine 105 can be connected to a network, e.g., the internet, enabling the user 110 to interact with the external engine 105 through, for example, the desktop computer connected to the internet. Alternatively, the user can interact with the external engine 105 using virtually any suitable instrument connected to the network, e.g., laptop computer, smart phone, personal digital assistant (PDA), a work station connected to a engine, and the like. The external engine 105 can include a search engine (SE) 115 and an advertisement engine (ADE) 120. The SE 115 can be configured to search the network, e.g., the internet, for information, products, and services of interest to a user 110 based on search criteria provided by the user 110. The ADE 120 can be configured to receive advertisements from a second system. The second system can be associated with one or more advertisers 125. Further, the external engine 105 can be configured to present, to a user 110, the advertisements received from the advertisers 125.

The SE 115 and the ADE 120 can be operatively coupled to interact with the user 110 and the advertisers 125, respectively, over a network and to interact with each other. In some implementations, the network can be the internet. In other implementations, the network can include local area networks (LANs), wide area networks (WANs), cellular telephone networks, intranets, and the like. The user 10 can search for information, products, services, and the like, that may be available using the SE 115. In addition to results for the information that the user 110 seeks, the ADE 120 can present, to the user 110, advertisements relevant to the user's search criteria. The advertisements can be provided to the ADE 120 by, for example, one or more advertisers 125.

In some implementations, the external engine 105 can be configured to present a first web page on a website to a user 110 and a second web page on a website to an advertiser 125 through which the user 110 and the advertiser 125 can interact with the external engine 105. For example, the user 110 can enter a uniform resource locator (URL) of a website related to the external engine 105 in a web browser, e.g., Internet Explorer. The URL can point to a landing page, which is a web page on the web site of the external engine 105. The landing page can be designed to allow a user 110 to interact with the external engine 105. In some implementations, the landing page can be designed to allow a user 110 to enter a query string. The SE 115 can be designed to receive the query string based on which the SE 115 can search, e.g., the internet, for information, products, services, and the like.

Similarly, the advertiser 125 can enter a URL in a web browser. The URL can point to a landing page which an advertiser 125 can interact with the external engine 105. In some implementations, the landing page can be designed to allow an advertiser 125 to present advertisements and keywords to the external engine 105. The ADE 120 can be operatively coupled to receive and store the advertisements. Additionally, the ADE 120 can be operatively coupled to the SE 115 such that the ADE 120 can identify advertisements relevant to the user 110 based on the query string that the user 110 provides to the SE 115. In some implementations, the URL pointing to a landing page for a user 110 and the URL pointing to a landing page for an advertiser 125 can be the same. In such implementations, the landing page can be designed to provide access to other web pages on the website that are designed specifically for users 110 and for advertisers 125, respectively. In other implementations, the URL pointing to a landing page for user 110 and the URL pointing to a landing page for an advertiser 125 can be different. In this manner, a user 110 and an advertiser 125 can interact with the external engine 105.

Figure 2:
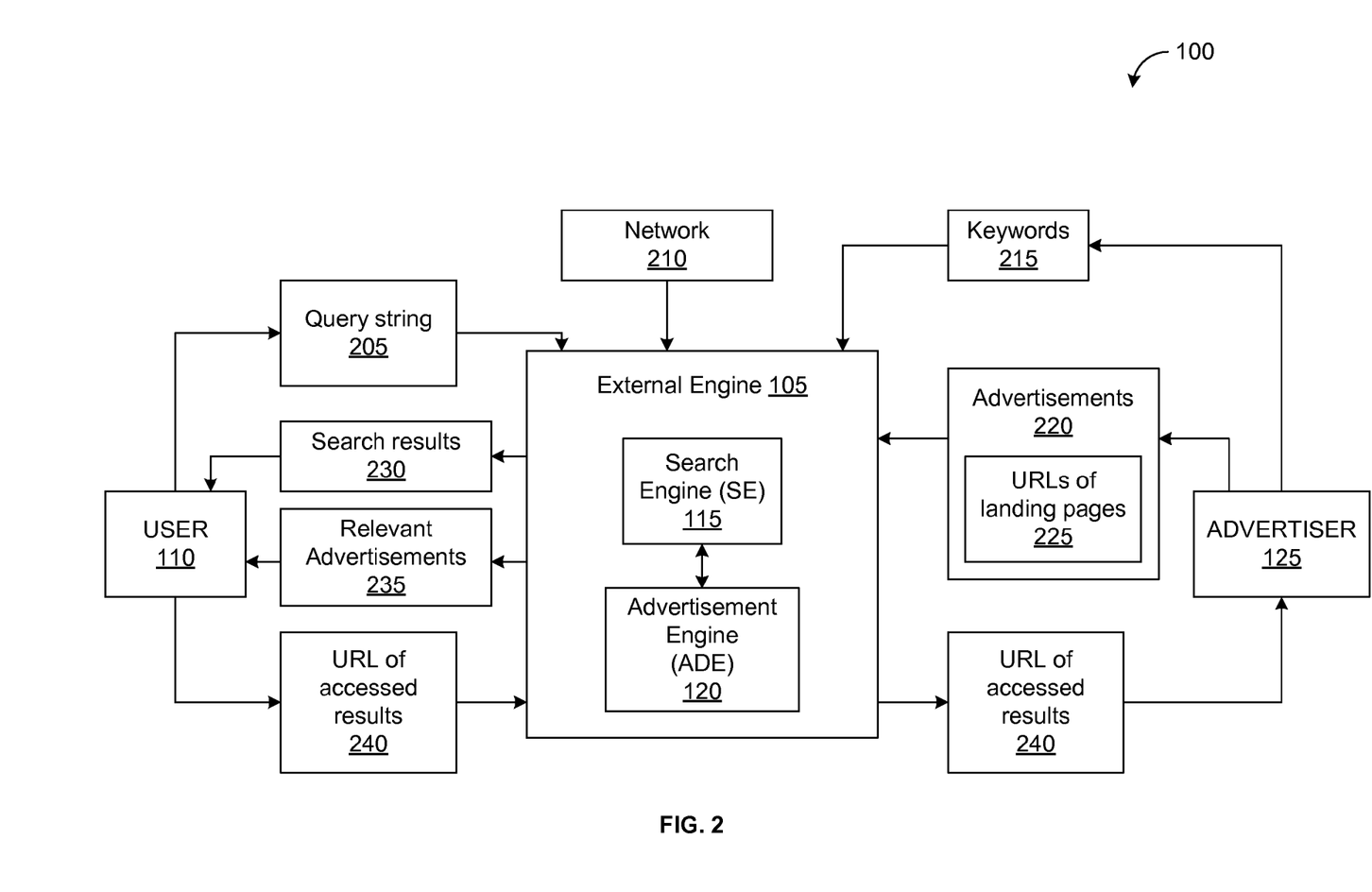
FIG. 2 is a block diagram of an example of inputs and outputs received by a system for capturing user attributes to provide to an advertiser.

FIG. 2 depicts a block diagram of an example of inputs and outputs received by a system 100 for capturing attributes of a user 110 to provide to an advertiser 125. The external engine 105 can be configured to receive search queries from a user 110, find information (e.g., on the internet) that are relevant to the user's search query, present the information to the user 110 and, in addition, present to a user 110 advertisements relevant to the user's search query. The external engine 105 can also be configured to identify user attributes, e.g., geographic location, and to include the identified user attributes in URLs to landing pages specified by the advertiser 125, e.g., by encoding values of attributes into the syntax of the URL. When a user 110 clicks on a URL with the encoded user attributes, the advertiser 125 can receive the user's attributes.

In some implementations, a user 110 can provide search criteria in the form of a query string 205. The query string 205 can include one or more keywords and/or key phrases that are pertinent to the topic in which a user 110 is interested. In some implementations, the query string 205 can include a combination of keywords that may be pertinent to the topic of the user's interest, but may be unrelated to one another. The query string 205 can include a list of words that can be separated by delimiters, e.g., spaces between the words, commas, semicolons, and the like. The query string 205 can include boolean operators. For example, a user searching for coffee shops in a particular city can enter "coffee shops AND city name" as a query string. In other implementations, boolean operators may not be required in the query string. The SE 115 can be configured to receive the query string 205.

In some implementations, a user 110 may be searching for products and services. For example, the user may wish to purchase items on the internet and may enter the type of item and "stores" in the query string. The SE 115 can receive the query string 205 from the user 110. The SE 115 and the ADE 120 can be operatively coupled to identify the advertisers 125 that provide the item and to present the advertiser's information to the user 110. In other implementations, the user 110 may be searching for information on a topic. For example, the user may search for information related to astronomy. The SE 115 can search the contents of the internet for information related to astronomy. In addition, the ADE 120 can be configured to recognize that the user 110 is searching for information related to astronomy and present, to the user 110, text books related to astronomy as well as information related to advertisers 125 who may sell such text books.

In some implementations, the network 210, on which the SE 115 searches for information can be the internet. The advertiser 125 can provide keywords 215 and advertisements 220 to the ADE 120. The keywords 215 can be one or more words and/or phrases that relate to an advertiser's products or services. If the keywords in the query string 205 match, the keywords 215 from the advertiser, either exactly or contextually, then the ADE 120 can display the advertisements 220 in response to the query string 205.

In some implementations, the advertisements 220 can be in the form of URLs that point to the advertiser's landing pages 225. The URLs can be hyperlinks designed such that when a user 110 accesses the URL, e.g., by clicking on the hyperlink with a mouse, the user 110 can be led to the advertiser's landing page. The contents of the advertiser's landing page can be designed to provide the user 110 with products and services of interest. An advertiser 125 can advertise their products and services in one or more landing pages. Each landing page can be part of the same website or different websites. In some implementations, each landing page can be accessed from the home page of the advertiser's website. Alternatively, or in addition, each landing page can be accessed by the unique URL of the landing page.

Upon receiving the query string 205 from a user 110, the external engine 105 can be configured to determine values of the user's geographic attributes. For example, if a user enters "widgets California," the external engine 105 can identify that the value of the attribute "State" is "California." Similarly, based on factors including the user's query string 205, the user's IP address, and the like, the external engine 105 can identify values of other user attributes. Further, in response to the query string 205, the user 110 can be presented with search results 230 that can include URLs that point to landing pages containing information about the user's search as well as URLs 225 that point to landing pages of relevant advertisements 235 created by the advertiser 125. The user 110 can access the landing pages by clicking on the URLs that point to the landing pages.

In some implementations, the website of an advertiser 125 with a national and/or international presence having products and services in several locations may include several landing pages, each landing page specific to a geographic location. The landing pages can be static or dynamically generated. The geographic location can be defined by one or more attributes including city, metro, state, country, postal code, latitude, longitude, and the like. Each URL can be encoded with the values of user's attributes. A user 110 presented with the search results 230 and the relevant advertisements 235 can click on one or more of the URLs. In this manner, the user can access the results of the search. When the URLs of accessed results 240 are provided to the advertiser, based on the values of the attributes, the advertiser 115 can direct the user 110 to different landing pages. Each landing page may contain information specific to a user 110.

Figure 3:
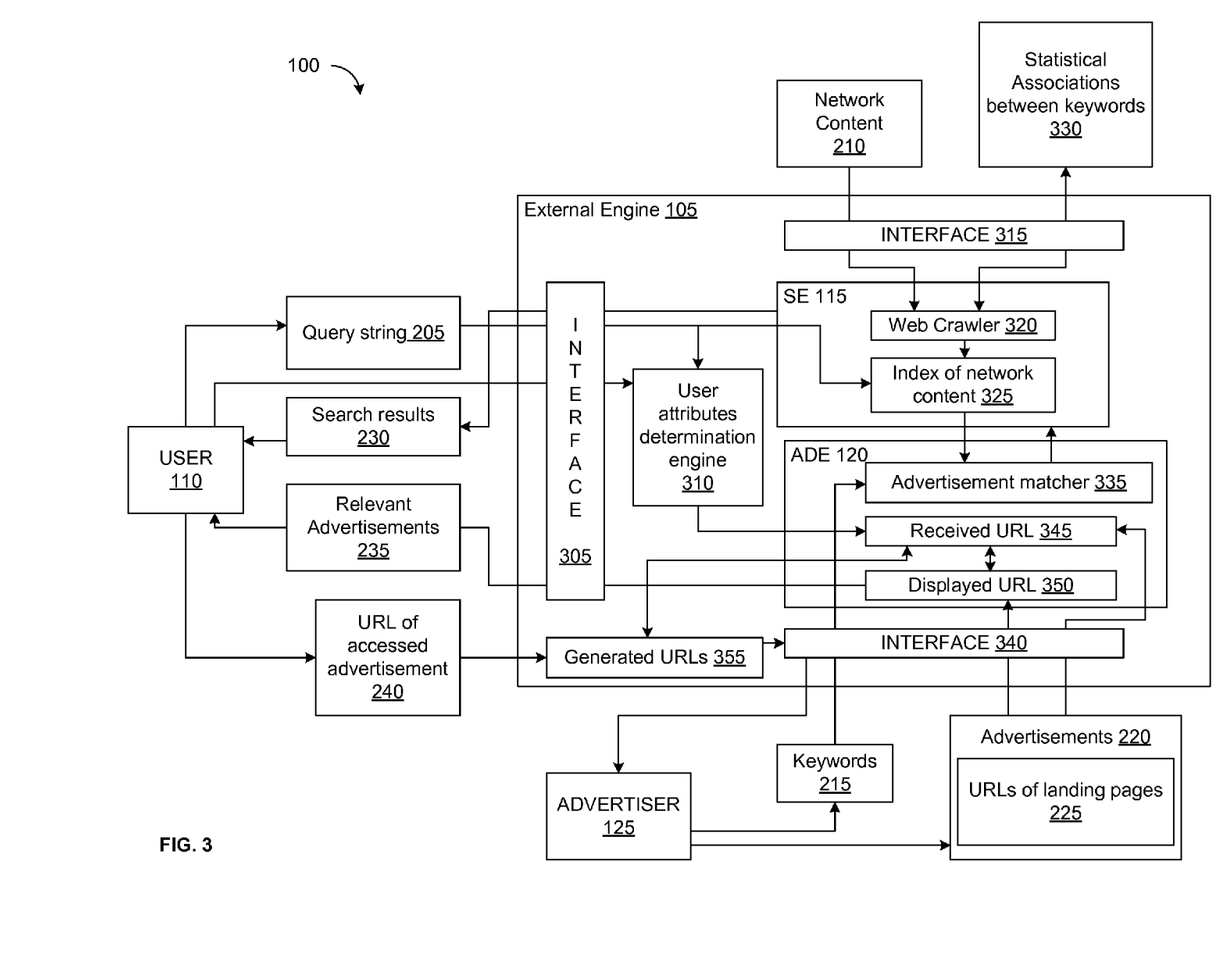
FIG. 3 is a block diagram of an example of an engine for capturing user attributes to provide to an advertiser.

FIG. 3 depicts a block diagram of an example of an external engine 105 for capturing attributes of a user 110 to provide to an advertiser 125. In some implementations, the attributes can relate to the geographic location of the user 110. The attributes can include one or more of the city, metro, state, country, postal code, latitude, longitude, telephone number, and the like. Alternatively, or in addition, the attributes can relate to virtually any information pertinent to the user.

In some implementations, the user 110 can interact with the external engine 110 via an interface 305. In some implementations, the external engine 105 can be connected to the internet. The user 110 can interact with the external engine 105 through a suitable instrument, e.g., desktop computer, laptop computer, smart phone, PDA, and the like, that is also connected to the internet. The interface 305 can be a web browser, e.g., Internet Explorer. Information exchange between the external engine 105 and the user 110 can be enabled by hypertext transmission protocol (HTTP). Alternatively, information exchange can also be enabled by other protocols, e.g., Wireless Access Protocol (WAP), depending on the connection between the external engine 105 and the network, and the user's computer and the network.

In some implementations, the external engine 105 can be configured to present a landing page to a user 110 in response to the user 110 entering a URL, in the web browser, that points to the engine's landing page. The landing page can include an interface configured to receive a query string 205 from the user 110. In some implementations, the engine's landing page can include text boxes into which the user 110 can enter the query string 205. In other implementations, the engine's landing page can include a browser tool bar into which the user can enter the query string 205. In some implementations, the query string 205 can be a string of text. The query string 205 can include one or more words. The words may be separated by delimiters including spaces, commas, quotes, and the like. The query string 205 can include keyword phrases where each phrase can include more than one word. Each keyword or keyword phrase in the query string 205 can be separated by boolean operators, including AND, OR, and the like.

In some implementations, the query string 205 can be text files. The text files can be uploaded into the engine's web page to serve as search criteria. In other implementations, the search criteria can be based on other file types including audio clips, video clips, and the like. The external engine 105 can be configured to identify the search topic based on the contents of the text file, the audio clip, or the video clip. In some implementations, the query string 205 can be a combination of multiple file types. For example, a user can upload an audio clip into the web page of the external engine 105 and enter a string, such as, "artist AND other songs." The external engine 105 can be configured to accept the audio clip and the text string as the query string 205.

The external engine 105 can include a user attributes determination engine 310 that can capture the attributes related to the user's geographic location or other user-specified data. In some implementations, the user attributes can be pushed to the determination engine 310 by the user, the user's computer, or both. In other implementations, the determination engine 310 can be configured to pull the user attributes from the user 110. The determination engine 310 can contain a list of attributes that can define a user's geographic location. Based on the user's information, the determination engine 310 can capture the associated values for each attribute. For example, if the determination system determines that the user resides in San Diego, Calif., the determination system can assign "San Diego" as the value to the attribute, "City," and "California" as the value to the attribute, "State." In this manner, the determination engine 310 can associate values to one or more attributes that can define a user's geographic location. In instances when a value is unavailable for one or more attributes, the distribution engine 310 can associate a "Null" value to the respective attributes indicating that no value is known.

In some implementations, the determination engine 310 can determine values for user attributes based on the query string 205 provided by the user 110. For example, a user can provide "Coffee shop 21220" as a query string. The determination system can identify that "21220" represents a postal code. Subsequently, the determination system can associate a value of "21220" to the "Postal code" attribute. In other implementations, the determination engine 310 can identify values for a user's geographic attributes based on the Internet Protocol (IP) address of the user's computer. The determination engine 310 can access a database (not shown) that maps geographic regions to IP addresses. Such a database can be included in the external engine 105. Alternatively, the database can be external to the external engine 105 and can be operatively coupled to interact with the external engine 105. The determination engine 310 can be configured to determine the IP address of the user's computer, access the database to determine a geographic location of the IP address, and associate the values obtained from the database to the attributes in the distribution engine 310. In some implementations, the determination engine 310 can determine values for user attributes when a user logs in to a system based on a registered user profile.

In some implementations, SE 115 can be configured to receive the query string 205. The SE 115 can further be configured to search the network content 210, e.g., the internet, for web pages that include information relevant to the query string 205. In some implementations, the SE 115 can receive the network content 210 via an interface 315. The SE 115 can include a web crawler 320. The web crawler 320 can traverse the web pages of web sites on the internet and determine the contents of the web pages. The contents of the web pages can be indexed and stored in the index of network contents 325. In addition, the web crawler 320 can generate statistical associations between keywords in the query string 205 and the content of the web pages. For example, the web page can contain information used by the web crawler to identify what keyword may be related to the content of the web page. This information can include text within the web page, keywords (e.g., metadata) that describe the content, frequencies of words occurring on the web page, font size of text on the web page, or a hyperlink structure within the web page. The web crawler 320 can store the statistical associations in a repository 330.

The SE 115 can receive a query string 205 from a user 110. The web crawler 320 can crawl the network content 210 to identify the content of web pages and index and store the content in the index of network content 325. Subsequently, the SE 115 can compare the query string 205 with the index of network content 325. The SE 115 can additionally include a list of URLs that each point to a web page. Upon identifying web pages that contain information relevant to the query string 205, the SE 115 can retrieve the URLs of the relevant web pages to present to the user 110. In some implementations, the SE 115 can rank the web pages and present web pages in an order of decreasing rank. The web pages can be ranked using the method described in the patent titled "Method for node ranking in a linked database," (U.S. Pat.

No. 6,285,999 B1; inventor: Lawrence Page; date of patent: Sep. 4, 2001), the contents of which are incorporated by reference here. In this manner, the SE 115 can be configured to search the interne to retrieve information related to a user's search query.

The ADE 120 can be operatively coupled to the SE 115 to identify advertisements 220 relevant to the user's interest based on the query string 205 received from the user 110. In some implementations, the ADE 120 can be configured to pull the results of the search by the SE 115. In other implementations, the SE 115 can be configured to push the results of the search to the ADE 120. The ADE 120 can include an advertisement matcher 335 that can be configured to determine advertisements 220 relevant to a user's interest based on the search results, the user query 205, the repository containing the statistical associations between keywords 330, or any combination of the same. In some implementations, the ADE 120 can receive the query string 205 provided by the user 110. Additionally, the ADE 120 can receive keywords 215 from the advertisers 125 that are relevant to the advertiser's products and services. The ADE 120 can compare the keywords 215 to the query string 205 to identify advertisements 220 that are relevant to the user's search criteria.

In some implementations, the advertiser 125 can provide advertisements 220 in the form of URLs of landing pages 225. The advertiser 125 can design the landing pages to present products and services offered by the advertiser 125 that may be of interest to the user 110. The URLs can be stored in the ADE 120. In some implementations, an advertiser 125 can provide two URLs—a received URL 345 and a displayed URL 350. The syntax of the received URL 345 can be different from that of the displayed URL 350. The ADE 120 can be operatively coupled with the user attributes determination engine 310 to receive the attributes of the user 110 determined by the engine 310. The syntax of a received URL 345 can be designed such that a user's attributes determined by the determination engine 310 can be inserted into the received URL 345, e.g., by encoding into the syntax of the received URL 345. For example, the determination engine 310 may determine that the value for attribute, "City," is "Mountain View." The syntax of the received URL 345 may be www.advertiser.com/<insert city value here>.html. The external engine 105 can be configured to encode the user's attribute values into the received URL 345. Therefore, in the example above, the external engine 105 can encode the value of the "City" attribute in the received URL 345 such that the received URL 345 looks like www.advertiser.com/city=MountainView.html. The syntax of the received URL 345 can be designed to receive one or more user attribute values. The syntax of the received URL 345 can also be designed to comply with pre-determined formats. Such pre-determined formats may be agreed upon by the advertiser 125 and the external engine 105. Alternatively, such pre-determined formats may be configured in the external engine 105. The external engine 105 can provide the advertiser 125 with the format and request the advertiser 125 to comply with the rules of the external engine 105 in designing syntaxes of the received URLs 345.

For example, the user 110 and the advertiser 125 may interact with the external engine 105 via a website, www.engine.com. Based on the user's information and the query string 205 provided by the user, the external engine 105 may determine that the attributes "City,", "Metro," "Metropolitan area," "State," "Country," "Postal code," "Latitude," "Longitude," and "Telephone number" have values "Mountain View," "San Jose," "Null," "CA," "USA," "94043," "Null," "Null," and "1.650.253," respectively. The "Null" values can indicate that the user attributes determination engine 310 was unable to determine values for attributes, "Metropolitan area," "Latitude," and "Longitude," respectively. In such instances, the formatted syntax of a received URL 345 can be http://www.engine.com/ads?city=Mountain%20View&metro=San %20Jose& Metropolita n%20Area=& state=CA&country= USA& postal=94043&lat=&lon=&phone=1.650.253

In some implementations, the received URL 345 can be made available to the user 110. For example, the advertiser 125 can additionally provide a displayed URL 350 that can be stored in the ADE 120. The displayed URL 350 can be the URL that is viewed by the user 110 in response to the user's query string 205. A received URL 345 can be mapped to a displayed URL 350. In this manner, the displayed URL 350 can be a token that represents the received URL 345 with the attribute values encoded in the URL syntax. The syntax of the displayed URL 350 can have lesser formatting notations than a received URL 345. In addition, the syntax of the displayed URL 350 can identify the advertiser 125 offering a product or service that may be of interest to a user 110. For example, a received URL 345 encoded with the geographic attributes of a user may have a syntax as follows: http://www:engine.com/ads?city=Mountain%20View&metro=San%20Jose& Metropolita n%20Area=&state=CA&country-USA& postal= 94043&lat=&lon=&phone=1.650.253 The received URL 345 can be represented by a token which is the displayed URL 350 that may have a syntax as follows: www.advertiser.com/advertisement.html.

In some implementations, each received URL 345 can represent a corresponding displayed URL 350. In such implementations, the syntax of the displayed URL 350 may include the user's attributes. Such inclusion may encourage the user to click on the displayed URL since the URL would represent the geographic region that the user is interested in. In other implementations, an advertiser 125 may provide one displayed URL 350 that represents all received URLs 345.

The external engine 105 can present the search results 230 of the SE 115 to the user 110. In some implementations, the search results 230 can include URLs pointing to landing pages that contain information relevant to the user's search. In addition, the external engine 105 can present snippets which include text from the landing pages that can be displayed adjacent to the URLs to the landing pages. In addition, one or more displayed URLs 350 provided by one or more advertisers 125 and determined to be relevant to the user's search criteria can be presented on a user's web browser as relevant advertisements 235. In some implementations, the SE 115 and the ADE 120 can be configured to independently present the search results 230 and the relevant advertisements 235 to the user 110. In other implementations, the ADE 120 can provide the displayed URLs 350 to the SE 115. The SE 115 can present both the search results 230 and the relevant advertisements 235 to the user 110. In other implementations, the SE 115 can provide the search results 230 to the ADE 120, which, in turn, can be configured to present the search results 230 and the relevant advertisements 235 to the user 110.

The search results 230 can include URLs to the one or more landing pages that contain information relevant to a user's query string 205. A user 110 can view the contents of the landing pages by clicking on the URLs of the landing pages. Clicking on the URL of a landing page can create a connection between the user's computer and the engine hosting the landing page. Similarly, the user 110 can view the relevant advertisements 235 by clicking on the displayed URL 350 of the advertisement. In some implementations, clicking on the URL of the relevant advertisement 235 can create a connection between the user's computer and the advertiser's engine. In other implementations, when the selection of a displayed URL 350 is detected, the received URL 345 that is represented by the displayed URL 350 can be provided to a second system, e.g., an advertiser's computer system, residing at a location, e.g., an advertiser's landing page, such that the displayed URL 350 points to the advertiser's landing page. For example, when the user clicks on a URL of an advertisement, the URL of the accessed advertisement 240 can be returned to the external engine 105. The external engine 105 can store the accessed URL under generated URLs 355. For example, the external engine 105 can encode user attributes determined by the user attributes determination engine 310 into the syntax of a received URL 345. The received URL 345 can be mapped to a displayed URL 350. The displayed URL 350 can be presented to the user as a relevant advertisement 235. The user 110 can click on the presented advertisement. The URL of the accessed advertisement 240 can be received by the external engine 105. The external engine 105 can identify that the received URL 345 encoded with the user's attributes in the URL syntax is the URL that the user accessed and store the URL in generated URLs 355. The external engine 105 can transmit the URLs in generated URLs 355 to the advertiser through the interface 340. The transmitted URLs can include the attributes of the user 110. In this manner, the external engine 105 can provide user attributes to an engine operated by an advertiser 125.

In some implementations, the URLs in the generated URLs 355 can be transmitted to an advertiser's engine (not shown). The advertiser's engine can be configured to receive the URLs and identify each user attribute. The advertiser's engine can display landing pages based on each attribute or combinations of attributes. Alternatively, the advertiser's engine can be configured to display a default page regardless of user attributes. In other implementations, the advertiser's engine can be configured to display a default landing page if the advertiser does not provide service in the geographic location of the user. In other implementations, the advertiser's engine can be configured to display a default landing page if a value for one or more of user's attributes is "Null."

Figure 4:
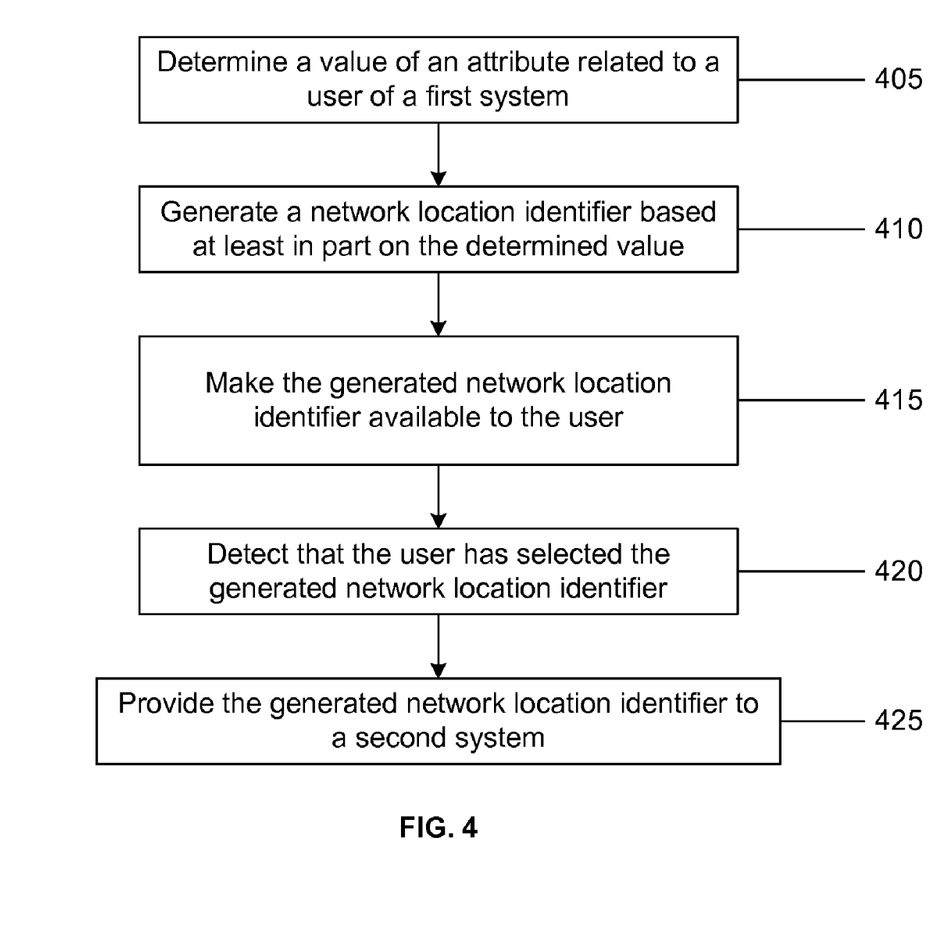
FIG. 4 is an example of a flow chart of a process for providing user attributes to an advertiser.

FIG. 4 depicts an example of a flow chart of a process for providing user attributes to an advertiser. A value of an attribute related to a user of a first system is determined at 405. The user can be connected to a network. The network can be the internet and the network location can be a web page on the internet. The user can be connected to the network through any suitable instrument, e.g., a computer. In some implementations, the attribute can be a network address of the first system, e.g., the internet protocol (IP) address. The attribute can be related to the user's geographic location. For example, the attribute can be "Postal code" and the corresponding value can be "22903." In other implementations, the geographical location can include one or more of a city, a metro, a state, a country, a postal code, a latitude, a longitude, and a telephone number. The attribute related to the first system can be determined when a user interacts with a web page of a web site on the internet using the first system. The value can be determined based on a query string that the user can provide to the first location. The value can also be determined based on a network address of the instrument, e.g., the IP address of the computer using which the user searches the internet.

A network location identifier based at least in part on the determined value of the attribute can be generated at 410. In some implementations, generating the network location identifier can include building a uniform resource locator (URL) by inserting the determined value into a predetermined URL format. For example, the determined value can be inserted into the predetermined URL format by encoding the value into a syntax of the URL. The predetermined URL format can be specified by an entity associated with the second system on the network. For example, the predetermined URL format can be received from an advertiser. The URL can point to a landing page designed and maintained by the advertiser at a second network location.

The generated network location identifier, e.g., the URL encoded with the values related to the user's attribute, can be made available to the user at 415. In some implementations, a token representing the generated network location identifier can be presented to the user. The token can also be a URL pointing to the landing page to which the URL received from the advertiser points. The token can include text, graphics, or a combination of both. The token can include a clickable link. In some implementations, the format of the syntax of the generated network location identifier including the values may render the appearance of the first syntax cumbersome. In such implementations, the token representing the generated network location identifier can have comparatively simpler syntax and appearance. In other implementations, the token can be the same as the generated network location identifier. In some implementations, the token, which is a URL, can be displayed on the web page that the user is viewing. The URL can be displayed as a hyperlink which the user can click on to be led to a second system which can be a landing page of a web site of the advertiser. The token can be provided by the advertiser. In some implementations, each generated network location identifier can have a corresponding token. In other implementations, a plurality of generated network location identifiers can be represented by the same token.

A user can be presented with the token representing the generated network location identifier. In some implementations, the user can be presented with one or more tokens representing one or more generated network location identifiers generated from predetermined URL formats received from one or more advertisers. The selection of the generated network location identifier can be detected at 420. For example, the token representing the generated network location identifier, e.g., a URL, can be presented as a hyperlink to the user at the first location. The user can click on the hyperlink using a cursor operated by a pointing device, e.g., a mouse. This can be an indication that the user has selected the generated network location identifier.

Upon detecting that the user has selected the generated network location identifier, the generated network location identifier can be provided to a second system at 425. The second system can also reside on the network at a location corresponding, at least in part, to the generated network location identifier. In some implementations, the generated network location identifier can be provided to the second system by transmitting the generated network location identifier from the first system to the second system. For example, when a user clicks on a token representing a predetermined URL syntax with encoded values, the URL can be transmitted to the advertiser's location. Information including the determined value can be organized into the predetermined URL format such that the information can be extracted by the advertiser's computer and used to present customized content to the user. Such customized content can be based on the user's location. Additionally, such customized content can include dynamically generating a customized web page to be presented to the user. For example, when the advertiser's computer receives the URL including a postal code associated with the user, the advertiser's computer can generate a web page identifying the advertiser's products and services available in that postal code and present the generated web page to the user. In other implementations, the advertiser's computer can direct the user to a pre-existing web page regardless of the values associated with the user's location. For example, if the user's attribute values indicate that the user is in a location where the advertiser does not provide services, the advertiser's computer may redirect the user to a home page of the advertiser's web site.

In some implementations, the user can search for information, products, services, and the like, on the internet by entering a search query at an appropriate location in the first web page. In response, the user can be presented with search results and advertisements related to the search results. The search results and advertisements can be URLs of landing pages containing relevant information, products, and services, that are displayed on the first web page as hyperlinks. The user can access the information, products, and services by clicking on the hyperlink. Based on the user's search query and other information, e.g., IP address of the user's computer, values for attributes related to the user's geographic location can be determined. These values can be encoded in one or more URLs pointing to advertiser's landing pages. When a user clicks on the URL, the advertiser can be provided with the URL including the attribute values pertaining to the user's geographic location. Based on the attribute values, advertisers can design their landing pages to more specifically target users.

A number of implementations have been described. Nevertheless, it will be understood that various modifications may be made without departing from the spirit and scope of the document. For example, the user may be a member of an online social network. The user may have a profile on the social network which is a web page including information related to the user. The web crawler in the external engine can crawl the user's profile web page to collect information relevant to the user. The profile can include attributes describing the geographic location of the user. In addition, the profile can also include the user's interests. The external engine 105 can capture the attribute values. Additionally, the advertisements presented to the user can be based on the contents of the user's profile. In some implementations, the advertisements presented to a user and the attributes collected from the user can be determined by a combination of the contents of a user's profile as well a query string provided by the user.

In some implementations, the user attribute values related to the user's geographic location may not be precise and/or may be ambiguous. For example, College Station, Tex., and Bryan, Tex., are geographically too close to each other that a user attributes determination system may be unable to determine exactly which town the user is interested in. Similarly, Vancouver, Wash., USA, and Vancouver, British Columbia, Canada, are also geographically close to each other. In such implementations, the external engine can determine an indication of precision, which the external engine can encode into the syntax of the received URL that is provided to the advertiser.

In some implementations, certain user attribute values may be inaccurate. In such implementations, if the external engine can specify a distance metric so that a level of inaccuracy of the attribute value can be specified. For example, the external engine may determine a value for the attribute "Latitude" and associate a distance metric of 95%. This may convey to the advertiser a 95% confidence level that the latitude value for the user is accurate. A lower value can indicate lower confidence.

In some implementations, an attribute may have more than one value. For example, the query string entered by a user can be "Coffee shops New York New Jersey." In such implementations, the attribute "State" has two values—"New York" and "New Jersey." In some implementations, the advertiser can configure the received URL to accept more than one value for the same attribute. In other implementations, the external engine can re-configure the syntax of the received URL to include the more than one attribute values. In other implementations, the external engine can be configured to request, from the advertiser, a received URL for each attribute value that the user attributes determination system captures. Each attribute value can be encoded into the syntax of the corresponding URL.

In some implementations, the external engine can be configured to determine an unknown attribute based on a determined attribute. For example, the user attributes determination system can determine a value of "22903" for the attribute "Postal code." Based on this value for the postal code, the external engine can further determine that the value of the attribute "City" is "Charlottesville" and the value of the attribute "State" is "Virginia." In some implementations, a user's language preference can be the attribute.

In some implementations, the external engine can be configured to determine a value of an attribute related to a user. Subsequently, the external engine can generate an identifier, e.g., a URL, that can include the determined value. The external engine can display the generated URL to the user. When the user clicks on the displayed URL, the external engine can provide content that correspond, at least in part, to the determined value. For example, the external engine can retrieve advertisements that are determined to be relevant to the user based on the determined values. The user attributes determination system can determine a value of "22903" for the attribute "Postal code." The external engine can generate a URL that includes the determined postal code and display the link to the user. When a user clicks on the link, in addition to providing the generated URL to a first advertiser, the external engine can retrieve advertisements from the first advertiser, other advertisers, or both, who have advertisements for products and/or services in the same postal code. Accordingly, other implementations are within the scope of the following claims.

What is claimed is:

1. A computer-implemented method, comprising:
  receiving, by a computer system comprising one or more computers, a search query from a user of a first system connected to a network;
  determining, by the computer system, a value of an attribute related to a geographical location of the user of the first system based at least in part on the query;
  receiving, by the computer system, a Uniform Resource Locator (URL) from a second system, the URL referencing a landing page that includes content;
  determining that the content included in the landing page satisfies the search query;
  modifying, by the computer system, the URL referencing the landing page based at least in part on the determined value to identify the determined value of the attribute related to the geographical location of the user resulting in a modified URL;
  including, by the computer system, the modified URL among a plurality of network location identifiers referencing respective landing pages, each including content that satisfies the search query;
  providing, by the computer system, the plurality of network location identifiers to the user of the first system in response to receiving the query;
  detecting that the user has selected the modified URL from the plurality of network location identifiers; and upon detecting that the user has selected the modified URL, providing the modified URL to the second system, wherein the modified URL identifies the determined value of the attribute related to the geographical location of the user of the first system to the second system, and wherein the second system provides content selected based on the value of the attribute related to the geographical location of the user to the first system.

2. The method of claim 1, wherein the network is the Internet.

3. The method of claim 1, wherein the attribute is a network address of the first system.

4. The method of claim 1, wherein the geographical location comprises one or more of a city, a metro, a state, a country, a postal code, a latitude, a longitude, and a telephone number.

5. The method of claim 1, wherein modifying the URL comprises inserting the determined value into the URL that has a predetermined URL format.

6. The method of claim 5, wherein inserting the determined value comprises encoding the value into a syntax of the URL.

7. The method of claim 5, wherein the predetermined URL format is specified by an entity associated with the second system on the network.

8. The method of claim 1, wherein providing the plurality of network location identifiers comprises presenting the user with a token representing the modified URL.

9. The method of claim 8, wherein the token comprises text, graphics, or a combination of both.

10. The method of claim 8, wherein the presented token comprises a clickable link.

11. The method of claim 10, wherein detecting that the user has selected the modified URL comprises detecting that the user has clicked on the clickable link.

12. The method of claim 1, wherein providing the modified URL to the second system comprises transmitting the modified URL from the first system to the second system.

13. The method of claim 1, wherein modifying the URL comprises organizing information including the determined value into a predetermined URL format such that the information can be extracted by the second system and used to present customized content to the user.

14. The method of claim 13, wherein the customized content is based on the user's geographical location.

15. The method of claim 13, wherein the customized content comprises a dynamically generated web page to be presented to the user.

16. The method of claim 13, wherein the modified URL corresponds to a URL of a pre-existing web page.

17. A system comprising:
one or more computers; and
a non-transitory computer-readable storage device storing instructions executable by the one or more computers to perform operations comprising:
receiving a search query from a user of a first system connected to a network;
determining a value of an attribute related to a geographical location of the user based at least in part on the query;
receiving a Uniform Resource Locator (URL) from a second system, the URL referencing a landing page that includes content;
determining that the content included in the landing page satisfies the search query;
modifying the URL referencing the landing page based at least in part on the determined value to identify the determined value of the attribute related to the geographical location of the user resulting in a modified URL;
including the modified URL among a plurality of network location identifiers referencing respective landing pages, each including content that satisfies the search query;
providing the plurality of network location identifiers to the user of the first system in response to receiving the query;
detecting that the user has selected the modified URL; and
upon detecting that the user has selected the modified URL, providing the modified URL to the second system, wherein the modified URL network location identifier identifies the determined value of the attribute related to the geographical location of the user of the first system to the second system, and wherein the second system provides content selected based on the value of the attribute related to the geographical location of the user to the first system.

18. The system of claim 17, wherein the network is the Internet.

19. The system of claim 17, wherein the attribute is a network address of the first system.

20. The system of claim 17, wherein the geographical location comprises one or more of a city, a metro, a state, a country, a postal code, a latitude, a longitude, and a telephone number.

21. The system of claim 17, wherein the operations further comprise inserting the determined value into the URL that has a predetermined URL format.

22. The system of claim 21, wherein inserting the determined value into the predetermined URL format further comprises encoding the value into a syntax of the URL.

23. The system of claim 21, wherein the predetermined URL format is specified by an entity associated with the second system on the network.

24. The system of claim 17, wherein providing the plurality of network location identifiers comprises presenting the user with a token representing the modified URL.

25. The system of claim 24, wherein the token comprises text, graphics, or a combination of both.

26. The system of claim 24, wherein the presented token comprises a clickable link.

27. The system of claim 26, wherein detecting that the user has selected the modified URL further comprises detecting that the user has clicked on the clickable link.

28. The system of claim 17, wherein providing the modified URL to the second system further comprises transmitting the modified URL from the first system to the second system.

29. The system of claim 17, wherein modifying the URL further comprises organizing information including the determined value into a predetermined URL format such that the information can be extracted by the second system and used to present customized content to the user.

30. The system of claim 29, wherein the customized content is based on the user's geographical location.

31. The system of claim 29, wherein the customized content comprises a dynamically generated web page to be presented to the user.

32. The system of claim 29, wherein the modified URL corresponds to a URL of a pre-existing web page.

33. A computer-implemented method comprising:
receiving, by a computer system comprising one or more computers, a Uniform Resource Locator (URL) related to an advertiser connected to a network;

receiving, by the computer system, a query from the user of the first system connected to the network;

determining, by the computer system, a value of an attribute related to a geographical location of the user;

receiving, by the computer system, a plurality of network location identifiers determined by a search engine as satisfying the received query, wherein the plurality of network location identifiers includes the URL related to the advertiser;

modifying, by the computer system, the URL by inserting the determined value of the attribute related to the user in the received URL resulting in a modified URL;

presenting, by the computer system, the plurality of network location identifiers to the first system in response to receiving the query, wherein the plurality of network location identifiers includes the modified URL;

detecting that the user has selected the modified URL;

in response to the detecting, providing the modified URL to the advertiser, wherein the advertiser provides content to the user that the advertiser selects based upon the determined value of the attribute related to the geographical location of the user that was included in the modified URL.

34. A system comprising:

one or more computers; and a non-transitory computer-readable storage device storing instructions executable by the one or more computers to perform operations comprising:

receiving a Uniform Resource Locator (URL) related to an advertiser connected to a network;

receiving a query from the user of the first system connected to the network;

determining a value of an attribute related to a geographical location of the user;

receiving a plurality of network location identifiers determined by a search engine as satisfying the received query, wherein the plurality of network location identifiers includes the URL related to the advertiser;

modifying the URL by inserting the determined value of the attribute related to the geographical location of the user in the received URL resulting in a modified URL;

presenting the plurality of network location identifiers to the first system in response to receiving the query, wherein the plurality of network location identifiers includes the modified URL;

detecting that the user has selected the modified URL; and in response to the detecting, providing the modified URL to the advertiser, wherein the advertiser provides content to the user that the advertiser selects based upon the determined value of the attribute related to the geographical location of the user that was included in the modified URL.

* * * * *

UNITED STATES PATENT AND TRADEMARK OFFICE
CERTIFICATE OF CORRECTION

| | | |
|---|---|---|
| PATENT NO. | : 8,150,979 B1 | |
| APPLICATION NO. | : 11/757919 | |
| DATED | : April 3, 2012 | |
| INVENTOR(S) | : Jeffrey D. Oldham | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Title Page, Item (57) ABSTRACT, on line 4, delete "par" and insert --part-- therefor.

Column 16, lines 15-16, delete "URL network location identifier" and insert --URL-- therefor.

Signed and Sealed this
Fourteenth Day of August, 2012

David J. Kappos
*Director of the United States Patent and Trademark Office*